United States Patent
Ohta et al.

(10) Patent No.: US 6,269,213 B1
(45) Date of Patent: Jul. 31, 2001

(54) OPTICAL TRANSMISSION DEVICE WITH OPTICAL FIBER CABLE ACCOMMODATING STRUCTURES

(75) Inventors: Masatomo Ohta; Shigeki Yamaji; Hiroyuki Abe; Masahiro Haga; Shinji Hiramatsu; Natsuo Masuda, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/192,495

(22) Filed: Nov. 17, 1998

(30) Foreign Application Priority Data

Jun. 17, 1998 (JP) .................................................. 10-170146

(51) Int. Cl.[7] ...................................................... G02B 6/00
(52) U.S. Cl. .......................... 385/135; 385/136; 385/137
(58) Field of Search .................................... 385/134, 135, 385/136, 137, 147, 138, 139; 242/107.1

(56) References Cited

U.S. PATENT DOCUMENTS

| | | | |
|---|---|---|---|
| 4,697,874 | * 10/1987 | Nozick | 385/135 |
| 4,776,662 | * 10/1988 | Valleix | 385/134 |
| 5,022,600 | * 6/1991 | Blane et al. | 242/107.1 |
| 5,412,497 | * 5/1995 | Kaetsu et al. | 385/135 |

FOREIGN PATENT DOCUMENTS

| | | |
|---|---|---|
| 58-157305 | 10/1983 | (JP) . |
| 58-166310 | 10/1983 | (JP) . |
| 60-244906 | 12/1985 | (JP) . |

* cited by examiner

Primary Examiner—Frank G. Font
Assistant Examiner—Sang H. Nguyen
(74) Attorney, Agent, or Firm—Staas & Halsey LLP

(57) ABSTRACT

An optical transmission device capable of accommodating superfluous lengths of optical fiber cables in a small space, and facilitating the workability for the operator and the maintenance of the device, is provided. An optical transmission device 10 includes a body 12 with an optical fiber cable accommodating structure attachment member 16 on a back surface of the body, drums 28 of thin disk shapes for winding the superfluous lengths of the optical fiber cables therearound, drum holders 30 for rotatably and detachably supporting the drums, and slide structures 32 for supporting the drum holder 30 so that the drum holders can move toward and away from the body 12. The drums 28 are arranged so that rotation axes of the drum extend horizontally and parallel to the back surface of the body 12.

10 Claims, 10 Drawing Sheets

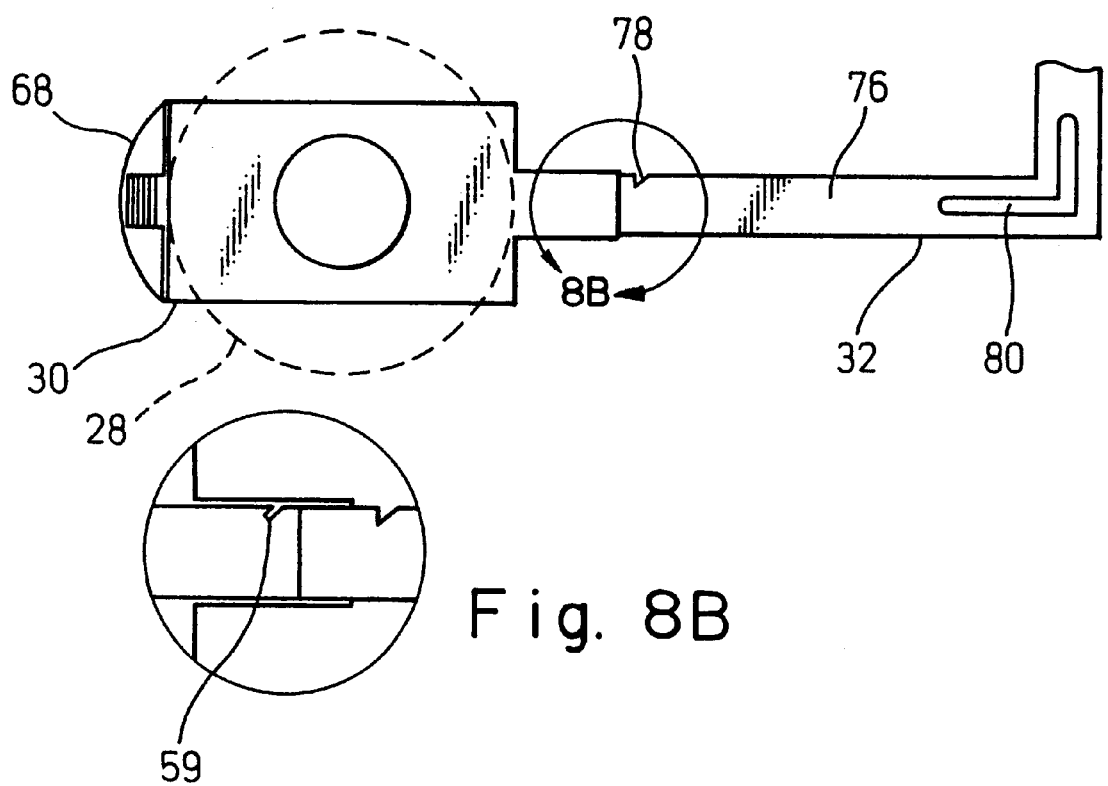

OPTICAL TRANSMISSION DEVICE WITH OPTICAL FIBER CABLE ACCOMMODATING STRUCTURES

BACKGROUND OF THE INVENTION

1. Field of the Invention

The present invention relates to an optical transmission device having accommodating structures for accommodating optical fiber cables.

2. Description of the Related Art

Optical transmission devices have recently been used not only for optical communication between telephone offices but also for optical communication in a subscriber's system which connects subscribers with telephone offices via optical fiber cables. Accordingly, it is necessary to accommodate a number of optical fiber cables in one optical communication device. The optical fiber cables have optical connectors at the ends thereof to be connected to the devices.

FIG. 10 illustrates a conventional method for accommodating superfluous lengths of optical fiber cables. The optical fiber cables are processed so that branch cables 24 extend from a main cable 22 and the lengths of the branch cables 24 from the main cable 22 are equal to each other, for connecting the branch cables 24 to an optical transmission device 100 while taking the difficulty in cutting the optical fiber cables into account. However, lengths of the branch cables from the main cable 22 to female type optical connectors 18 arranged on a back surface of a body of the optical transmission device 100 may be different from each other in accordance with the position of a respective cable holder 26 for the main cable 22. To adjust the difference in length between the respective branch cables, in the prior art, arms 102 carrying holders 104 are provided on the back surface of the body of the optical transmission device 100 to wind superfluous lengths of the branch cables 24 around the holders in a plane parallel to the back surface. This requires a larger space for the branch cables 24, extending in parallel to the back surface of the body of the optical transmission device 100.

In this method for accommodating superfluous lengths of optical fiber branch cables 24, it is necessary to take care of the problem of the space necessary for winding a number of optical fiber branch cables 24 and the problem of interference between an optical fiber branch cable and other optical fiber branch cables 24 during the mounting operation. For example, if the number of optical fiber branch cables 24 to be accommodated increases, the optical fiber cables are not fully wound around the holders 104 or, even if they could be wound, they cover the back surface of the body of the optical transmission device and disturb the connection of other cables. Also, if it is desired to remove part of the branch cables, all the optical fiber cables must be dismounted from the device and mounted again thereafter. In addition, there is a problem that the arms 102 themselves become obstacles to the connection of the branch cables 24 to the optical transmission device 100.

Methods and apparatuses which can solve these problems of superfluous lengths of optical fiber cables are disclosed in Japanese Unexamined Utility Model Publication (U.M. Kokai) No. 58-157305, Unexamined Patent Publication (Kokai) No. 58-166310 and No. 60-244906. These methods and apparatuses, however, have drawbacks that the mounting of the accommodating structures to the optical transmission device is difficult and that the requirement for the high density accommodation of cables is not satisfied.

Recently, the demand for connecting a number of optical fiber cables to an optical transmission device has increased. With this demand, problems are arising in that the optical fiber cables cannot be fully accommodated in the holders or, when it is necessary to remove some of optical fiber cables from the holders during the rearrangement thereof, all the optical fiber cables wound around the holder must be also dismounted, resulting in problems in workability and maintenance.

SUMMARY OF THE INVENTION

The object of the present invention is to provide an optical transmission device by which superfluous lengths of optical fiber cables can be accommodated in a smaller space and workability and maintenance can be improved.

To achieve the above object, the present invention provides an optical transmission device provided with a body having a back surface, in the interior of which are accommodated electronic devices necessary for the telephone exchange and optical fiber cable accommodating structures for accommodating of superfluous lengths of optical fiber cables, the body being provided with optical fiber cable accommodating structure attachment members for attaching the optical fiber cable accommodating structures, characterized in that an optical fiber cable accommodating structure comprises a plurality of drums for winding superfluous lengths of optical fiber cables onto the respective drums each of which has a rotation axis, drum holders for detachably and rotatably supporting the drums, and slide structures for supporting the drum holders so that the drum holders can move toward and away from the body and so that the respective rotation axis of the drum extend horizontally and parallel to the back surface of the body, wherein the drums have thin disk-like shapes and are arranged on the side of the back surface of the body in parallel to each other.

According to the present invention, superfluous lengths of optical fiber cables are wound in the vicinity of the optical connectors for connecting the optical fiber cable, by using drums disposed vertically (In the prior art, the superfluous lengths are wound in the lateral direction.) and therefore it is possible to accommodate the superfluous lengths of optical fiber cables without interfering with connection areas of other optical connectors and to attach the optical fiber cables at a pitch corresponding to the actual pitch of the optical connectors when the optical fiber cables are sequentially accommodated, resulting in an improvement in the accommodation capability of the device.

BRIEF DESCRIPTION OF THE DRAWINGS

The present invention will be described below in more detail with reference to the preferred embodiments illustrated in the attached drawings, wherein:

FIG. 8A is a detailed illustration of one example of a stopper in the drum holder and a notch in a slide structure used in the optical fiber cable accommodating structure of the optical transmission device according to the present invention;

FIG. 8B is a detailed illustration of an example of a stopper in the drum holder and a notch in a slide structure used in the optical fiber cable accommodating structure of the optical transmission device according to the present invention;

DESCRIPTION OF THE PREFERRED EMBODIMENTS

Figure 1:
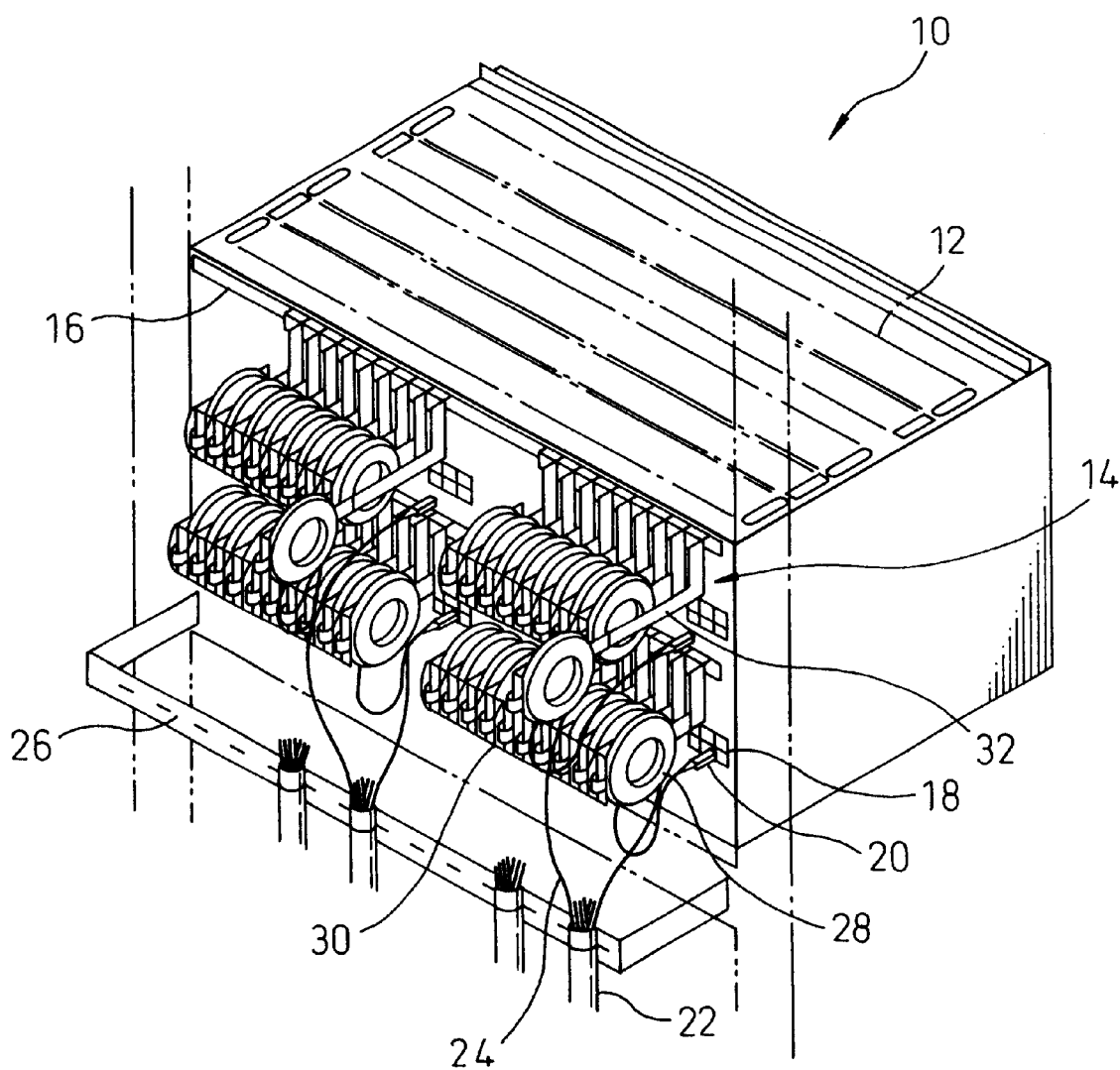
FIG. 1 illustrates a principle of an optical transmission device.

FIG. 1 illustrates a principle of the present invention. An optical transmission device 10 includes a body 12 in which electronic devices necessary for the telephone exchange are arranged, and optical fiber cable accommodating structures 14 for accommodating superfluous lengths of optical fiber cables.

An optical fiber cable accommodating structure attachment member 16 for attaching the optical fiber cable accommodating structures 14 and female type optical connectors 18 are arranged on the back surface of the body 12. Male type optical connectors 20 attached to distal ends of optical fiber branch cables 24 which are branched from optical fiber main cables 22 and processed to have mutually equal lengths are insertable into the female type optical connectors 18. The optical fiber main cables 22 are secured to the body 12 by cable holders 26 provided on the back surface of the body 12.

The optical fiber cable accommodating structures 14 for accommodating superfluous lengths of the optical fiber branch cables 24 include a plurality of drums 28 for winding superfluous lengths of the optical fiber branch cables 24, drum holders 30 for rotatably and detachably supporting the drums 28 and slide structures 32 for supporting the drum holders 30 so that the drum holders 30 can move toward and away from the body 12.

The optical fiber cable accommodating structure attachment member 16 is provided on the back surface of the body 12 for equally distributing the optical fiber cable accommodating structures 14 carrying the drum holder 30 relative to the body 12. The optical fiber cable accommodating structure attachment member 16 may have threaded holes 17 for fixing the position of the optical fiber cable accommodating structures 14 after the latter have been located in place in the optical fiber cable accommodating structure attachment member 16 (see FIG. 2). Preferably, the threaded holes 17 are provided at a pitch corresponding to a minimum pitch of the female type optical connectors 18 arranged on the back surface of the body 12. To increase the number of optical fiber cables to be accommodated, two optical fiber cable accommodating structure attachment member 16 may be arranged in a vertical row on the back surface of the body 12. The optical fiber cable accommodating structure attachment member 16 is made of an extruded structural member having an H-shaped cross-section to facilitate an increase in the slide structures 32 and to resist external stresses both in the vertical direction and in the horizontal direction (rotational movement). The ends of the slide structures 32 having an angular C-shape are engaged with the optical fiber cable accommodating structure attachment member 16 having the H-shaped cross-section. Thus, thirty-six optical fiber cable accommodating structures 14 can be arranged according to the present invention, while in the prior art, six such structures may be physically maximum.

The drums 28 have thin disk-like shapes and are disposed vertically relative to the back surface of the body 12 in parallel with each other. The drums 28 may be arranged at a pitch equal to that of the female type optical connectors provided on the back surface of the body. For example, they may be arranged at a minimum pitch of 15.24 mm. As shown in FIG. 1, the optical fiber branch cables 24 branched from the optical fiber main cable 22 secured by the cable holder 26 can be wound around the drums 28. The respective drum holders 30 are attached to the respective slide structures 32 attached to the back surface of the body 12, whereby the drums 28 are supported by the body 12. The drums 28 are attached to the drum holders 30 so that the rotation axes of the drums 28 extend horizontally and parallel to the back surface of the body 12 of the optical transmission device 2. By attaching the drums 28 in such a manner, it is possible to minimize the size of the optical fiber cable accommodating structures 14 and to increase the number of the latter up to thirty six. The number of the corresponding structures was five in the prior art and the number of the structures of the present invention is increased by seven times. Further, if two optical fiber cable accommodating structures are provided in vertical rows on the back surface of the body, the number of the structures may be doubled. Thus, it is possible to allocate the drums 28 to the respective packages accommodated in the optical transmission device 10. The operation for adding and removing cables is facilitated, while in the prior art, such an operation was difficult.

Figure 2:
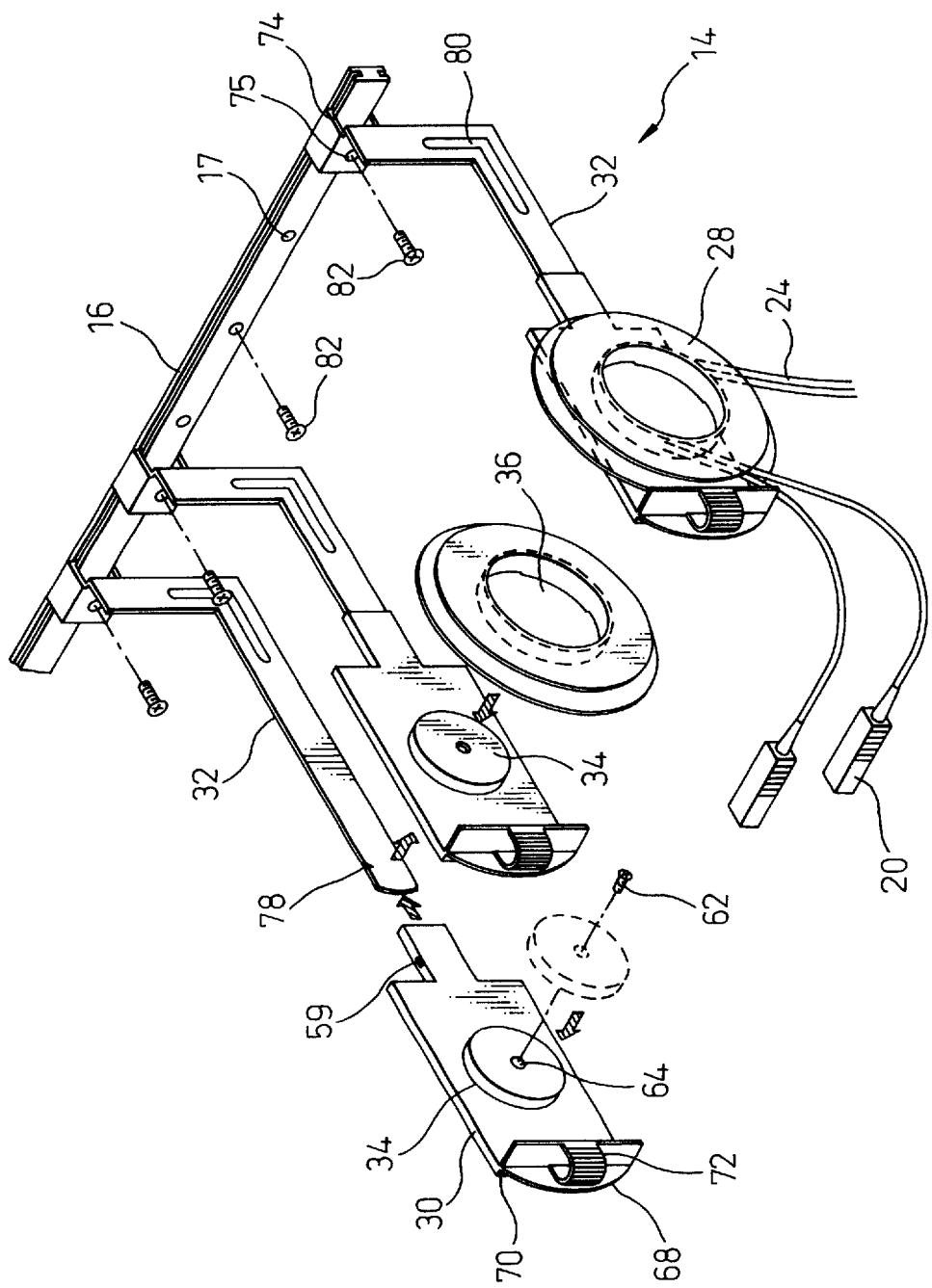
FIG. 2 is an exploded view of a main part of FIG. 1.

FIG. 2 illustrates one embodiment of a mechanism for holding the drums 28. A set of the drum 28 and the drum holder 30 are provided with a first element and a second element which attract each other. The first and second elements are, for example, a magnet 34 and an iron plate 36 which is a magnetic material, as shown in FIG. 2. In FIG. 2, the drum holder 30 has the magnet 34 rotatably attached thereto, while the drum 28 has the iron plate 36. Needless to say, the drum holder 30 may have the iron plate 36 and the drum 28 may have the magnet 34. Due to the above-mentioned structure, the drum 28 is non-directional with respect to the left/right and is attached in a rotatable and detachable manner (see FIGS. 2 and 4).

Figure 3:
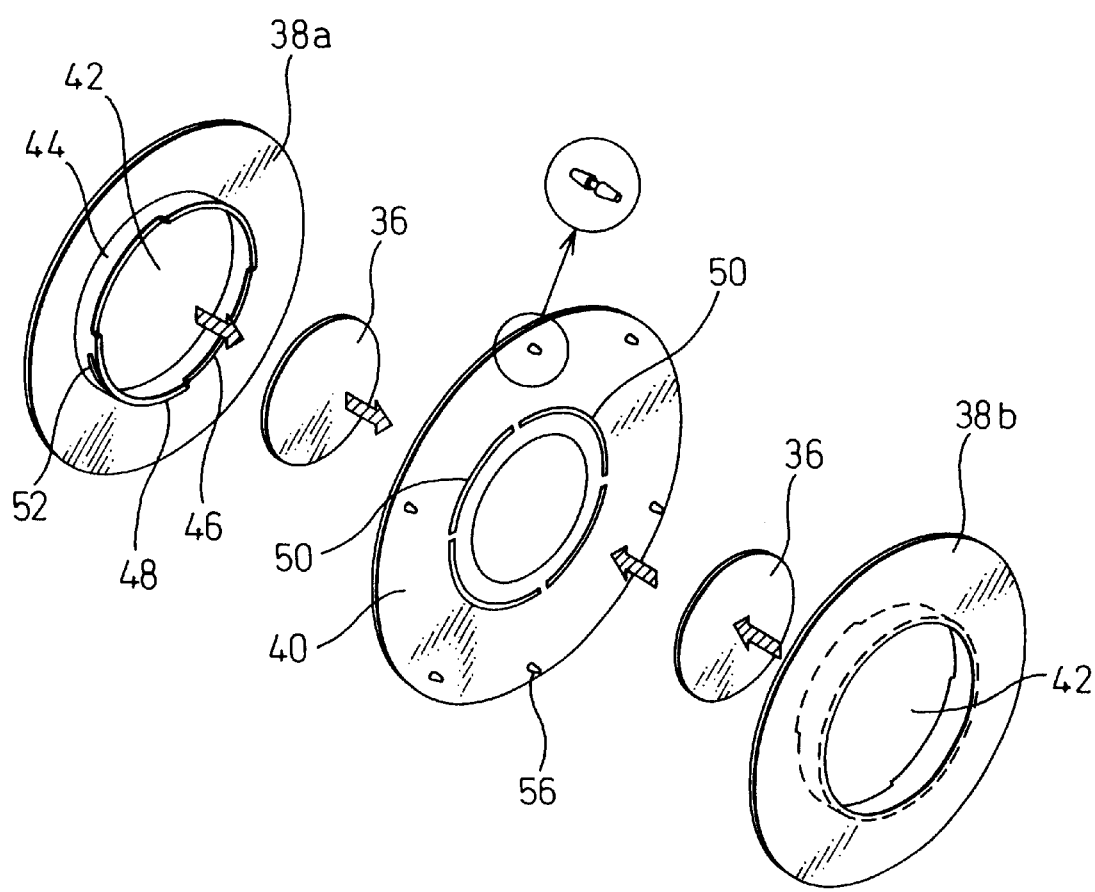
FIG. 3 is an exploded view of an embodiment of an optical fiber cable accommodating drum of the optical transmission device according to the present invention.
Figure 4:
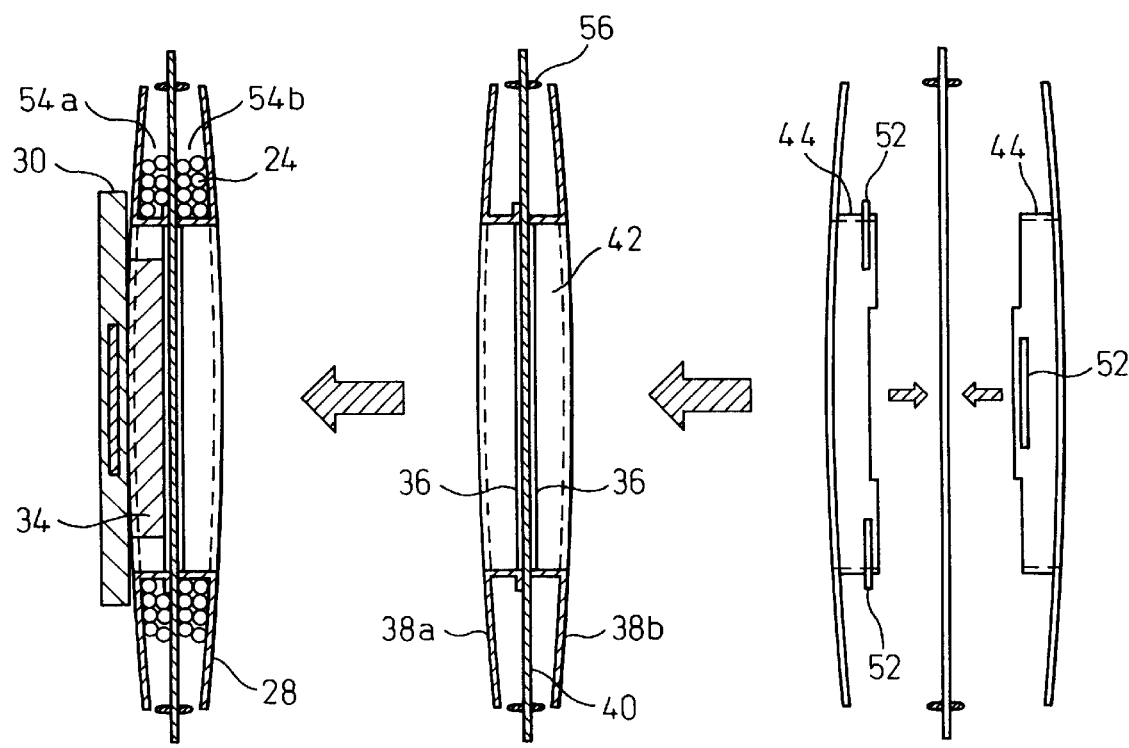
FIG. 4 is a view illustrating the assembly sequence of the drum.

FIGS. 3 and 4 illustrate an embodiment of the drum 28. As shown in these drawings, the drum 28 has a thin disk-like shape, preferably having a circular profile. The drum 28 comprises a pair of disks opposed to each other, i.e., a first disk 38a and a second disk 38b, an intermediate disk 40 interposed between the pair of disks 38a, 38b and having a larger diameter than that of these disks 38a, 38b and a pair of iron plates 36 disposed on the left and right sides of a central portion of the intermediate disk 40 to be attracted by the magnet 34. Preferably, the disks 38a, 38b and the iron plates 36 have circular shapes. The iron plates 36 are fixed to the opposite sides of the central portion of the intermediate disk 40 by a suitable means such as a double sided adhesive tape. The iron plates 36 preferably have the same dimension as the magnet 34 secured on the drum holder 30. An opening 42 is provided in the central region of each of the pair of disks 38a, 38b for accommodating the magnet 34 therein, and the opening 42 is encircled by a cylindrical flange 44 which defines a core of the drum for winding the cable therearound. A distal end of the peripheral edge of the flange 44 has recesses 46 and projections 48 complementary to each other as shown in FIGS. 3 and 4. The projections 48 of the distal end of the flange 44 of the first disk 38a engage with the processes 46 of the second disk 38b complementary thereto disposed to the former disk while interposing the intermediate disk 40, through a circular slit divided into a suitable number (four in FIG. 3) of arcuate sections 50 formed in a central region of the intermediate disk 40. On the other hand, the projections 48 of the second disk 38b engage with the recesses 46 of the flange 44 of the first disk 38a through the arcuate sections 50 adjacent to the former sections, after which the pair of disks 38a and 38b are bonded together, for example, by ultrasonic welding or another method. Since the slit is divided into the plurality of sections 50, the inner side and the outer side of the arcuate sections 50 cooperate with each other to ensure a space for the attachment of the magnet 34.

Each of the first and second disks 38a, 38b further has side ribs 52 in the proximal position of the projections 48 of the flange 44 at the same level as the recesses 46, which is operative to secure the intermediate disk 40 in place when the pair of disks 38a, 38b are bonded together. The intermediate disk 40 is larger than either of the first and second disks 38a, 38b to prevent the cable from entering an adjacent winding position during the winding of the optical fiber cable.

FIG. 4 illustrates the assembly sequence of the drum. Since the drum 28 is divided by the intermediate disk 40 to define a pair of grooves as shown in FIG. 4, the optical fiber branch cables 24 wound in the respective grooves are easily identifiable; for example, one of the grooves is usable as an exclusive position 54a for an input optical fiber cable and the other is usable as another exclusive position 54b for an output optical fiber cable. Accordingly, any complication is greatly reduced after an increase in the number of optical fiber cables and the removal thereof, such a complication being caused by winding a plurality of optical fiber branch cables 24 at the same position, (particularly, damage of optical fiber cables is effectively prevented from occurring and the identification thereof is facilitated to a great extent). Also, the first and second disks 38a, 38b are preferably curved inward to provide a structure wherein the drums hardly interfere with each other even though more drums 28 are laterally installed in parallel to each other.

As shown in FIGS. 3 and 4, a plurality of fiber stoppers 56 made of a soft material are provided on the outer peripheral region of the intermediate disk 40, for preventing the optical fiber cable from becoming slack. The fiber stopper 56 may be formed of a spindle-shaped rubber piece. The fiber stoppers 56 may be arranged at a suitable pitch while penetrating the thickness of the intermediate disk 40. As shown in FIG. 4, the fiber stoppers 56 are arranged in alignment with the outer periphery of the first and second disks 38a and 38b. The fiber stoppers 56 of soft material according to the present invention are flexible and, in response to a sudden tension of the optical fiber cable, are able to perform a sufficient support function in the usual use which is different from that of a prior art hard holder.

Figure 5:
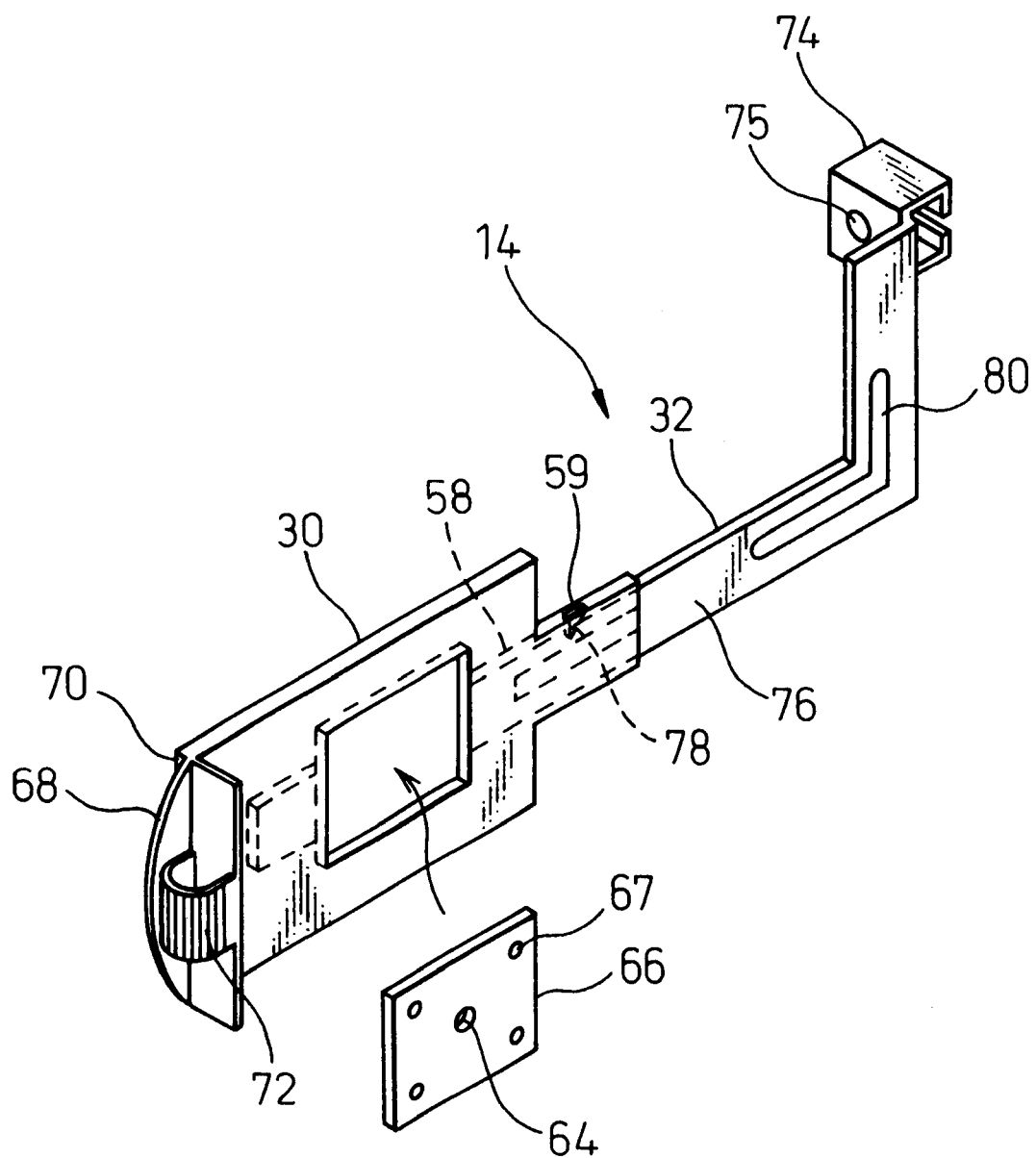
FIG. 5 is a perspective view of an optical fiber cable accommodating structure of the optical transmission device according to the present invention.
Figure 6:
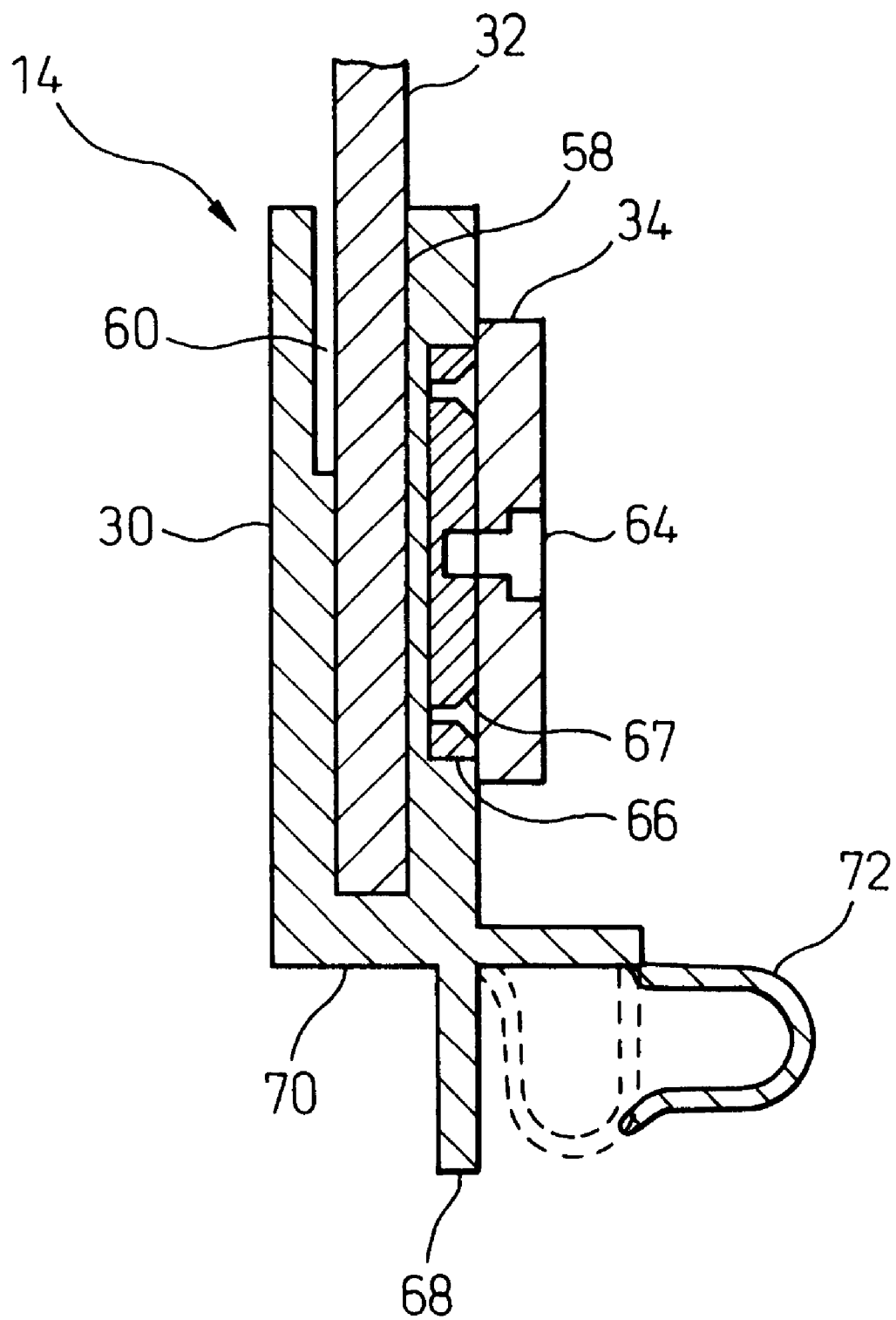
FIG. 6 is a cross-sectional view of a drum holder used in the optical transmission device according to the present invention.

As shown in FIGS. 5 and 6, the drum holder 30 has a slide groove 58, into which the slide structure 32 is inserted and from which the same can be withdrawn when necessary, and a stopper 59 for preventing the drum holder from coming off from the slide structure 32. By inserting the slide structure 32 attached to the body 12 into the slide groove 58, the drum 28 is supported so that the drum 28 can move toward and away from the body 12. As shown in FIG. 6, a relief 60 is provided in the slide groove 58 for avoiding the slide motion of the drum holder 30 from interfering with a reinforcement bulge 80 formed on the slide structure 32. For the purpose of the weight reduction, the drum holder 30 may be made of a resinous material.

As shown in FIG. 2, the drum holder 30 is provided with the magnet 34 secured thereto at the center of a circular surface of the magnet by a screw 62 for detachably supporting the drum 28. A spot facing hole 64 is formed in the magnet 34 so that a head of the screw 62 does not disturb the attachment of the drum 28. A length of the screw 62 shown in FIG. 2 is selected not to interfere with the movement of the slide structure 32 after the magnet 34 has been attached by the screw 62 (see FIG. 6). Thus, the drum 28 is freely rotatable about the screw 62 while being attracted by the magnet 34. If the drum holder 30 is made of a resinous material, a magnet fixture 66 is solely formed from a non-ferrous material to guarantee strength for the attachment of a screw, and is made integral with a residual portion of the drum holder 30 by injecting a molten resin into conical holes 67 provided in the magnet fixture 66, as shown in FIG. 6 (see FIGS. 5 and 6). After the fixation, the bulged resin is scraped off from a surface of the magnet fixture 66 to become flush therewith.

As shown in FIGS. 5 and 6, the drum holder 30 also has a pulling grip 68 formed integral therewith for facilitating the withdrawal thereof. Adjacent to the grip 68, an indication space 70 for identifying an optical fiber cable accommodated in the associated drum and an operable holder 72 for holding the optical fiber cable are provided. The indication space 70 may carry a label or other parts.

As shown in FIG. 5, the slide structure 32 is an L-shaped member having an angular C-shaped attachment section 74 to be engaged with the groove of the optical fiber cable accommodating structure attachment member 16 provided on the back surface of the body 12 at one end, and a slide rail 76 for mounting the drum holder 30 at the other end. The slide rail 76 has a notch 78 in the vicinity of a distal end thereof for preventing the drum holder 30 from coming off therefrom. Preferably, the L-shaped member is obtained from a steel plate by blanking. One end of the L-shape member is defined to be the rail 76 for slidingly fitting to the drum holder 30, and the other end is shaped to have an angular C-shape so that the slide structure 32 can slidingly move along the groove of the optical fiber cable accommodating structure attachment number 16. Finally, the notch 78 is provided in the vicinity of a front end of the rail for preventing the drum holder 30 from coming off.

To fix the angular C-shaped attachment section 74 to the optical fiber cable accommodating structure attachment member 16, the angular C-shaped attachment section 74 may be provided with a hole 75. In such a case, the optical fiber cable accommodating structure attachment member 16 is also provided with threaded holes 17. After the angular C-shaped attachment sections 74 are positioned to the respective holes of the optical fiber cable accommodating structure attachment member 16 so that the respective threaded holes 17 are aligned with the respective holes 75, each of screws 82 is inserted into the holes to fix the attach sections 74 and the attachment member 16 together as shown in FIG. 2.

Figure 7A:
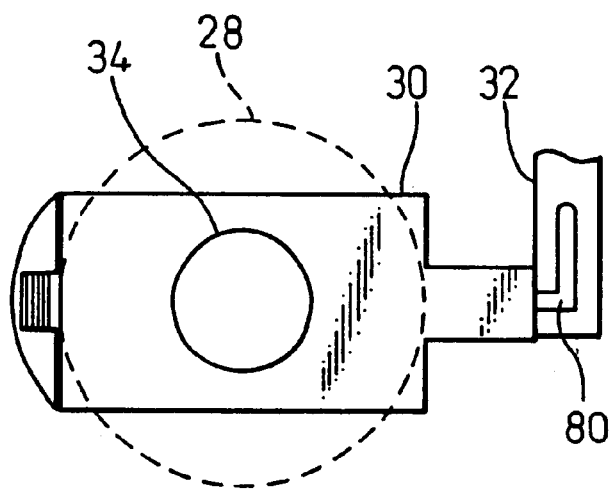
FIG. 7A is a partial side view of the optical fiber cable accommodating structure in a position close to a body of the optical transmission device.
Figure 7B:
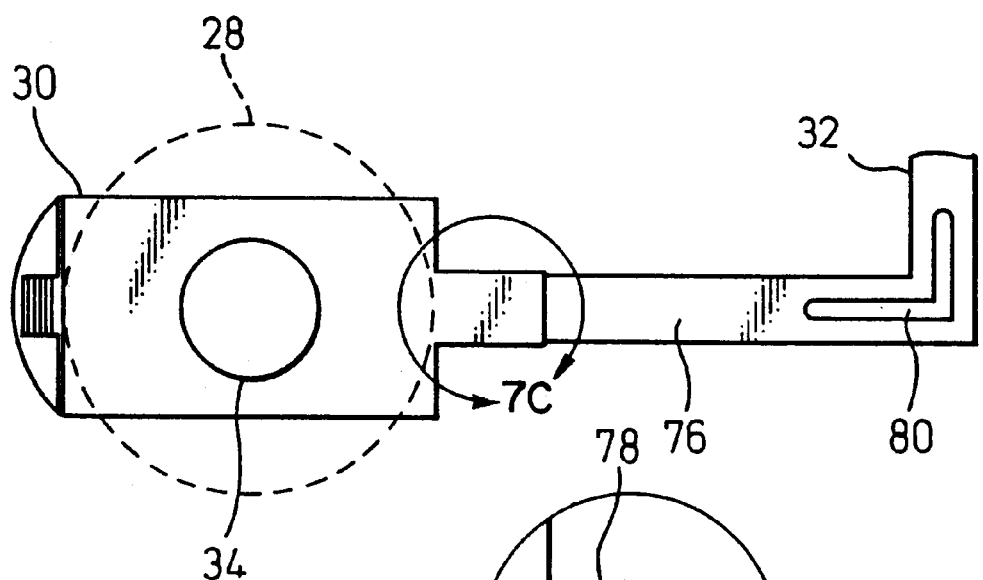
FIG. 7B is a partial side view of the optical fiber cable accommodating structure in a position where the optical fiber cable accommodating structure is withdrawn from the position close to the body, illustrating a relationship between the two positions close to and withdrawn from the body.
Figure 7C:
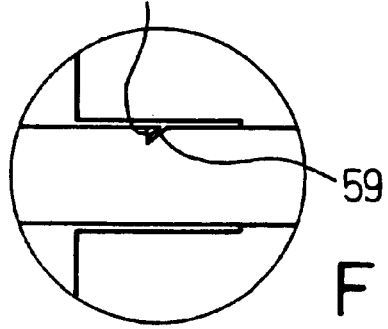
FIG. 7C is a partial side view of the optical fiber cable accommodating structure in a position where the optical fiber accommodating structure is withdrawn from the position close to the body.

As shown in FIGS. 7A, 7B, and 7C, the notch 78 is provided at a position wherein the detachment of the drum is not disturbed when the drum holder 30 has been withdrawn outward from a normal position closer to the body 12. The stopper 59 provided in the drum holder 30 and the notch 78 provided in the slide structure 32 have the shapes shown in FIGS. 7A, 7B, 7C, 8A, and 8B. Due to such shapes, the stopper 59 of the drum holder 30 is engageable with the notch 78 when the drum holder 30 is withdrawn outward from the position closer to the body 12 to prevent the drum holder 30 from coming off from the slide structure 32. The engagement is easily released by pushing the drum holder 30 toward the body 12.

As shown in FIG. 5, the slide structure 32 has the reinforcement bulge 80 in a proximal end region of the L-shape for enhancing the strength against a leftward/rightward force. The reinforcement bulge 80 is formed by press shaping to be bulged leftward to be durable to a stress applied when the drum 28 is loaded.

Figure 9:
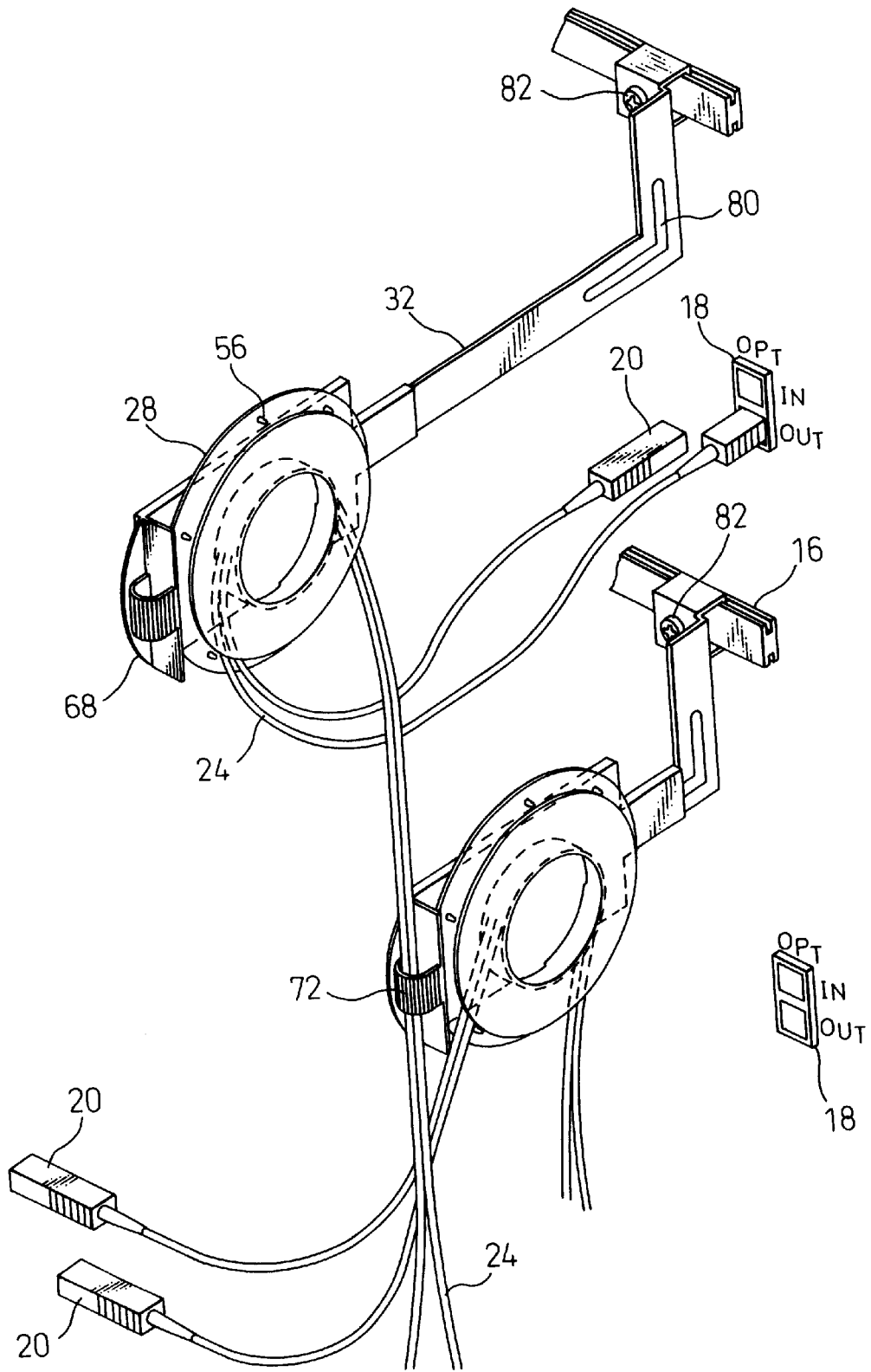
FIG. 9 illustrates a method for accommodating superfluous lengths of optical fiber cables in the optical transmission device according to the present invention.

FIG. 9 illustrates a method for accommodating superfluous lengths of the optical fiber cables by the optical fiber cable accommodating structures 14 according to the present invention. In the optical fiber cable accommodating structures according to the present invention, the superfluous lengths of the optical fiber cables are treated as follows. The grip 68 of the optical fiber cable accommodating structure 14 corresponding to the optical fiber cable to be subjected to the connection and the accommodating of superfluous length is pulled forward by the operator. Thereby, the drum contained therein is in a freely detachable state, and it is possible to accommodate the superfluous length on the detached drum 28. After the superfluous length of the optical fiber branch cable 24 has been wound around the drum 28, the male type optical connector 20 attached to the distal end of the optical fiber branch cable 24 is connected to the female type optical connector 18 on the back surface of the body 12. The drum 28 is supported by the drum holder 30, and the optical fiber cable accommodating structure 14 is pushed inward to the original position closer to the back surface of the body by the grip 68. Thus, the storage of the optical fiber cable is completed.

Figure 10:
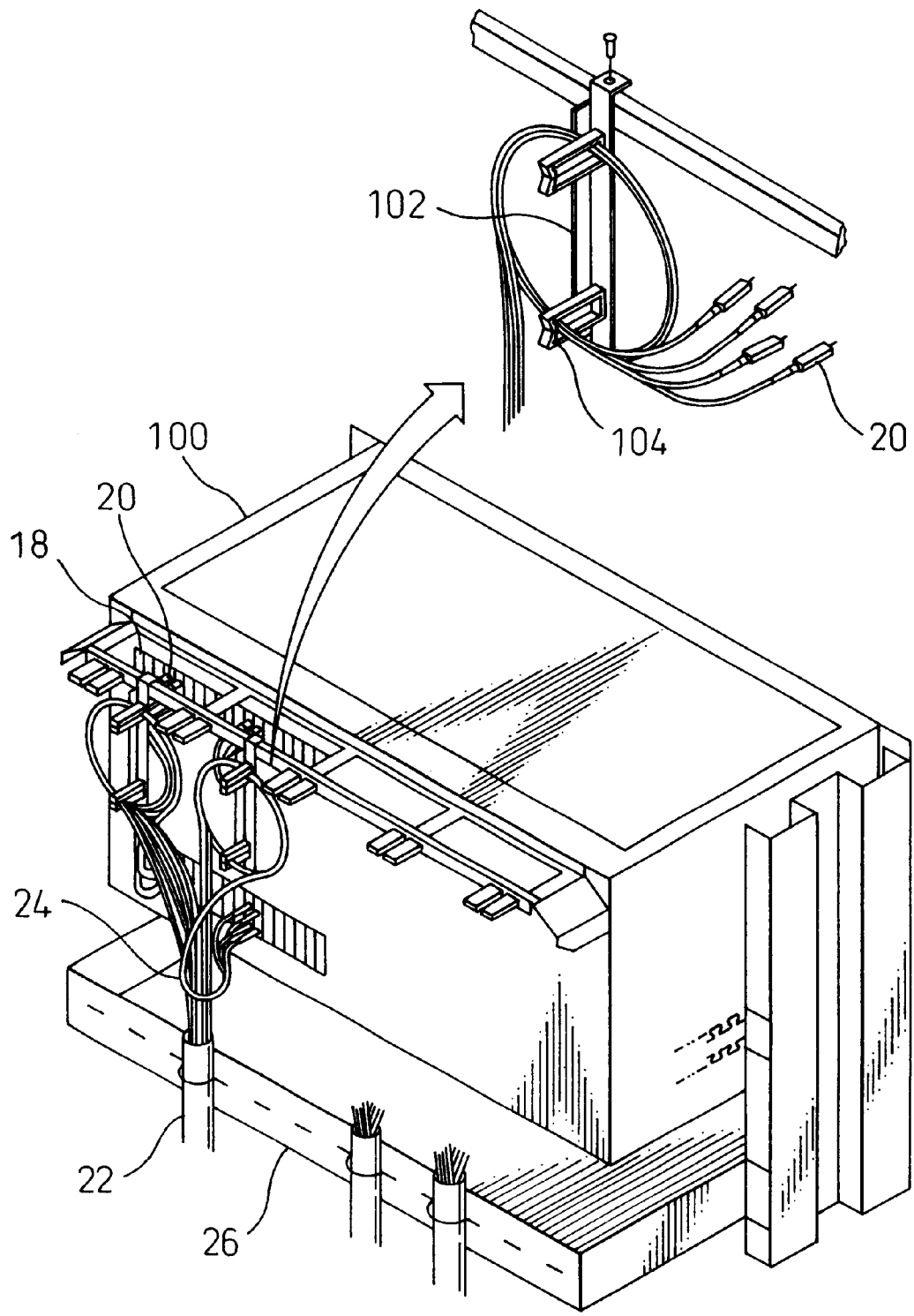
FIG. 10 is a perspective view illustrating a prior art device.

As shown in FIG. 10, according to the conventional optical fiber cable holder, since a plurality of branch cables 24 are accommodated together in one location of the optical fiber cable holder, it is impossible to provide a label or the like indicating what kinds of cables are accommodated therein. Contrarily, according to the present invention, as shown in FIG. 9, it is possible to easily identify a number of accommodated optical fiber branch cables 24 individually. Especially, if the optical fiber cable accommodating structures 14 are superposed with each other in a double stage manner, a length of the cable hanging down from the upper stage can be bundled by the operable holder 72 to avoid the concealment of the label for identifying the cable by the hanging cables. Also, since the grip 68 exclusive for the withdrawal is provided, the handling of the drum holders 30 is enhanced.

As described herein above, according to the present invention, the structures for accommodating the superfluous lengths of optical fiber cables are compact in size and capable of treating a number of optical fiber cables six to twelve times as large as that of the conventional structures of the same size. If the number of optical packages increases, it is possible to individually accommodate the superfluous lengths of the respective cables. Also, kinds and uses of the optical fiber cable are visible by the label indication, which facilitate the cabling operation.

What is claimed:

1. An optical transmission device comprising:
   a body having a back surface;
   a plurality of drums for winding superfluous lengths of optical fiber cables onto said plurality of drums, each of said plurality of drums having a rotation axis;
   drum holders for detachably and rotatably supporting said plurality of drums; and
   slide structures secured to the back surface of the body for slidably supporting the drum holders so that the drum holders can move toward and away from the body and so that the rotation axes of said respective plurality of drums extend horizontally and parallel to the back surface of the body.

2. An optical transmission device as defined by claim 1, wherein each of said plurality of drums is attached to each of said drum holders by first and second cooperating attracting elements, the drum holder having one of the first and second elements and the drum having the other of the first and second elements.

3. An optical transmission device as defined by claim 2, wherein the first and second elements are a combination of a magnet and a magnetic material.

4. An optical transmission device as defined by claim 1, wherein the drums have thin disklike shapes and are arranged on the side of the back surface of the body in parallel to each other.

5. An optical transmission device as defined by claim 4, wherein the drum comprises a pair of disks opposed to each other, an intermediate disk disposed between the pair of disks and having a size larger than that of the pair of disks, and a core extending between the pair of disks.

6. An optical transmission device as defined by claim 5, wherein a plurality of fiber stoppers made of a soft material are provided on the outer peripheral region of the intermediate disk, for preventing the optical fiber cable from becoming slack.

7. An optical transmission device as defined by claim 1, wherein the drum holder is provided with a pulling grip having an indication space and a operable holder for holding the optical fiber cables.

8. An optical transmission device as defined by claim 1, wherein the slide structure has an L-shape, one end of which has a slide rail inserted into the drum holder for holding the drum holder to be movable toward and away from the body and a notch for preventing the drum holder from coming off therefrom, and the other end of which has an angular C-shaped attachment section to be attached to an optical fiber cable accommodating structure attachment member, the optical fiber cable accommodating structure attachment member having an H-shaped cross-section engageable with the attachment member having the angular C-shape.

9. An optical transmission device comprising:
   a body having a back surface;
   a plurality of drums for winding superfluous lengths of optical fiber cables onto said plurality of drums, each of said plurality of drums having a rotation axis;
   drum holders for detachably and rotatably supporting said plurality of drums; and
   slide structures for supporting the drum holders so that the drum holders can move toward and away from the body and so that the rotation axes of said respective plurality of drums extend horizontally and parallel to the back surface of the body, wherein the drum holder is provided with a pulling grip having an indication space and a operable holder for holding the optical fiber cables.

10. An optical transmission device comprising:

a body having a back surface;

a plurality of drums for winding superfluous lengths of optical fiber cables onto said plurality of drums, each of said plurality of drums having a rotation axis;

drum holders for detachably and rotatably supporting said plurality of drums; and slide structures for supporting the drum holders so that the drum holders can move toward and away from the body and so that the rotation axes of said respective plurality of drums extend horizontally and parallel to the back surface of the body, wherein the slide structure has an L-shape, one end of which has a slide rail inserted into the drum holder for holding the drum holder to be movable toward and away from the body and a notch for preventing the drum holder from coming off therefrom, and the other end of which has an angular C-shaped attachment section to be attached to an optical fiber cable accommodating structure attachment member, the optical fiber cable accommodating structure attachment member having an H-shaped cross-section engageable with the attachment member having the angular C-shape.

* * * * *